(12) United States Patent
Tidwell

(10) Patent No.: US 6,352,344 B2
(45) Date of Patent: *Mar. 5, 2002

(54) SCANNED RETINAL DISPLAY WITH EXIT PUPIL SELECTED BASED ON VIEWER'S EYE POSITION

(75) Inventor: Michael Tidwell, Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/782,931

(22) Filed: Feb. 14, 2001

Related U.S. Application Data

(63) Continuation of application No. 09/536,481, filed on Mar. 27, 2000, now Pat. No. 6,204,829, which is a continuation of application No. 09/027,356, filed on Feb. 20, 1998, now Pat. No. 6,043,799.

(51) Int. Cl.[7] .................................................. A61B 3/14
(52) U.S. Cl. ...................................................... 351/209
(58) Field of Search ..................... 345/7, 8, 9; 359/630, 359/631, 632, 633, 13, 199; 351/209, 210; 606/10, 11, 12

(56) References Cited

U.S. PATENT DOCUMENTS 6,008,781 A * 12/1999 Furness, III et al. ............ 345/8
6,252,565 B1 * 6/2001 Hall .............................. 345/8

* cited by examiner

Primary Examiner—George Manuel
(74) Attorney, Agent, or Firm—Steven P. Koda

(57) ABSTRACT

A scanned retinal display includes an optical scanning array to generate multiple exit pupils in conjunction with an eyepiece. The multiple exit pupils expand the effective exit pupil. As a user moves their eye the eye moves from one exit pupil to another. A scanning array creates the multiple exit pupils to maintain a clear line of sight for an augmented display. Also, a viewer's eye position is tracked. To achieve a larger effective exit pupil and the pin hole effect advantage of a small exit pupil, only one exit pupil of the multiple pupils is active to enter the user's eye.

18 Claims, 4 Drawing Sheets

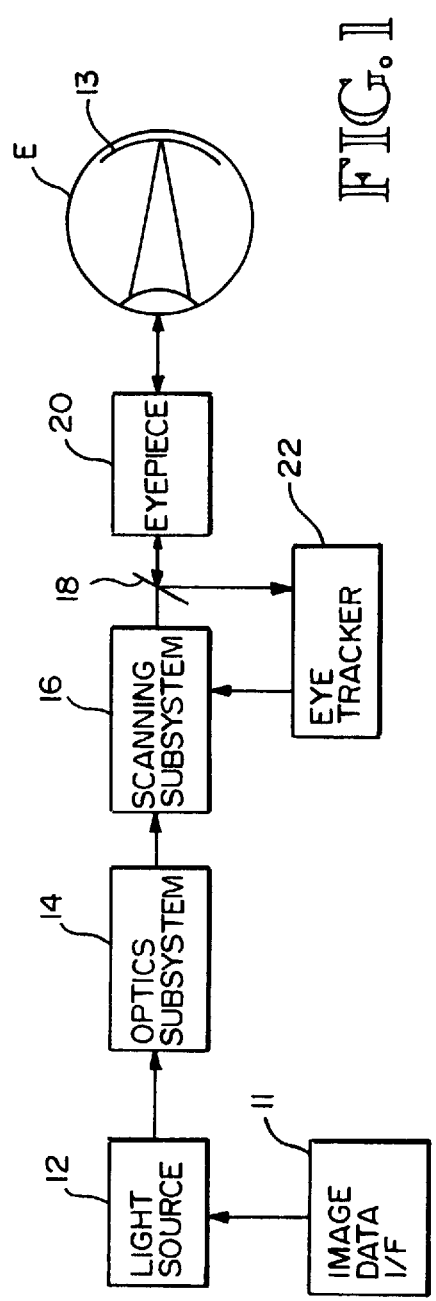
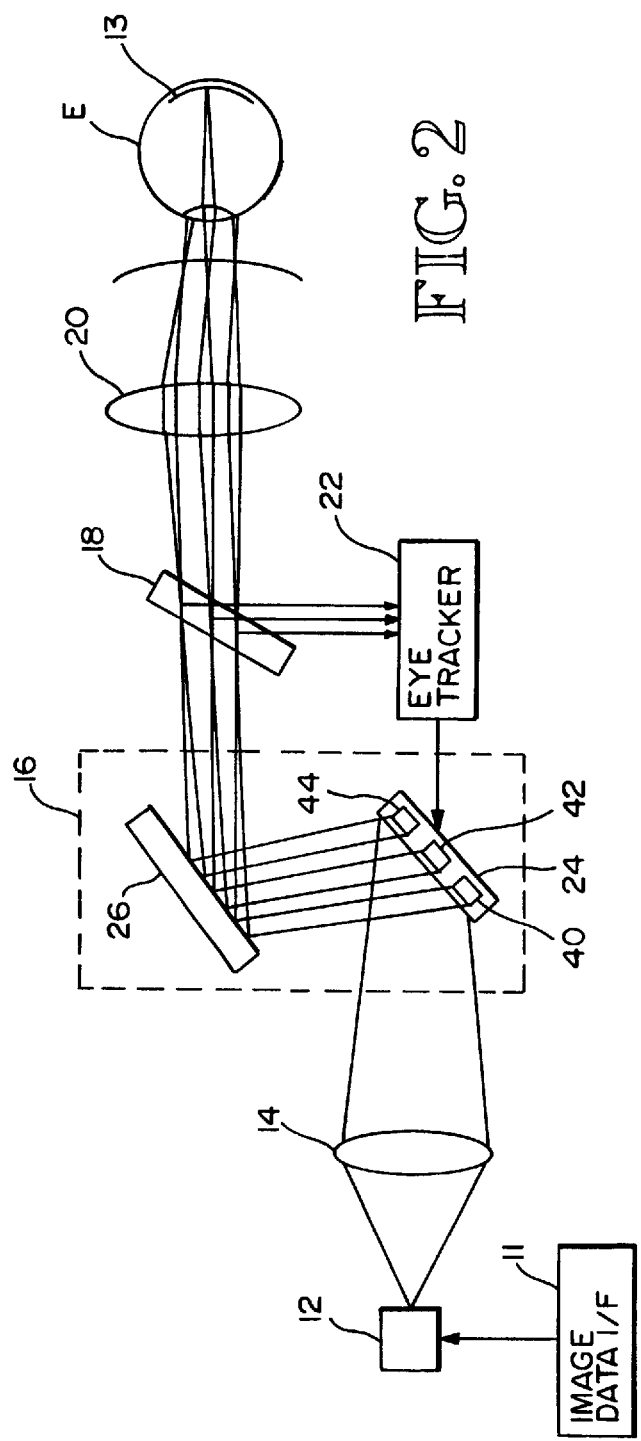

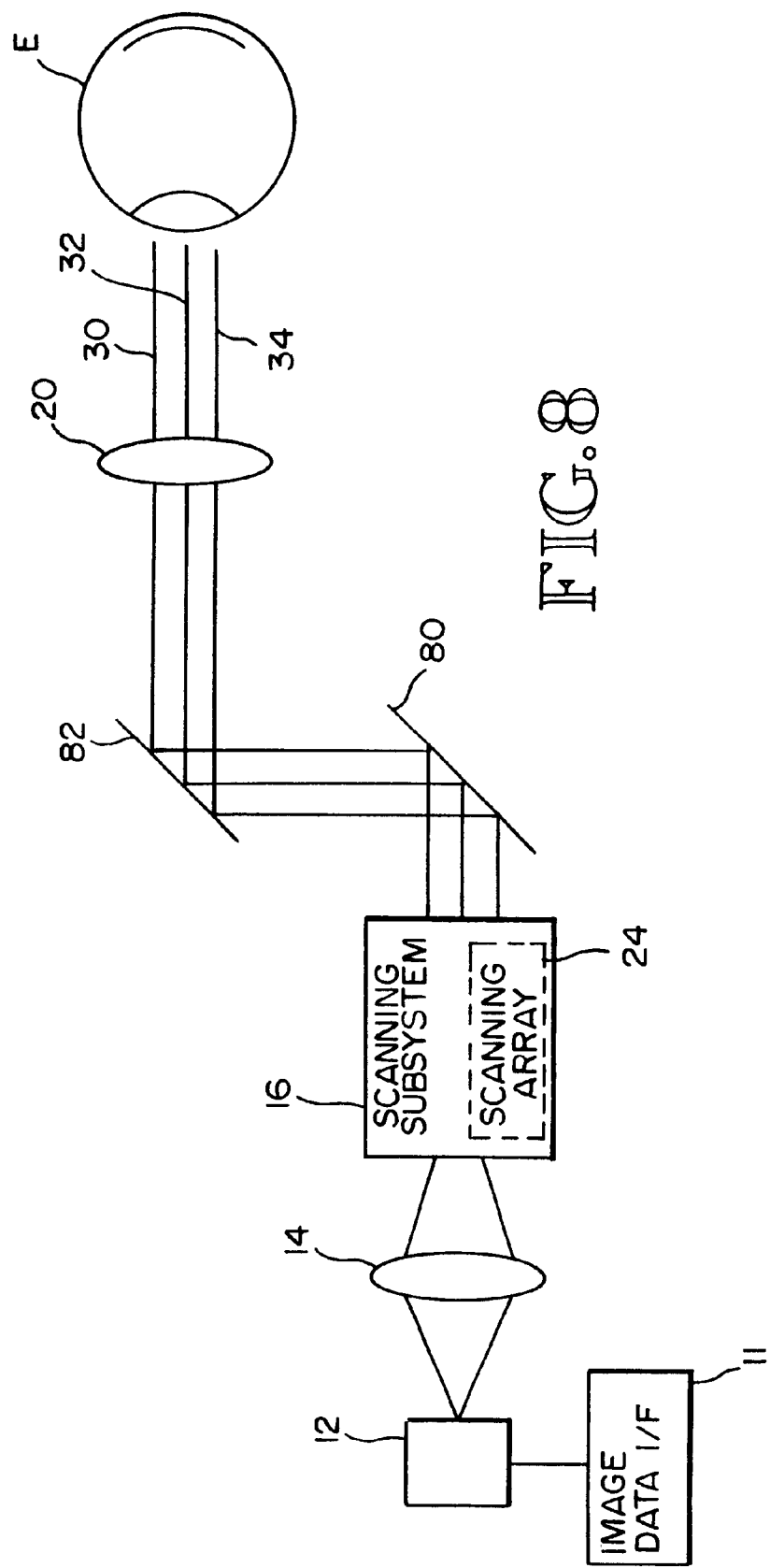

SCANNED RETINAL DISPLAY WITH EXIT PUPIL SELECTED BASED ON VIEWER'S EYE POSITION

CROSS REFERENCE TO RELATED APPLICATIONS

This is a continuation of U.S. patent application Ser. No. 09/536,481 filed Mar. 27, 2000 now U.S. Pat. No. 6,204,829 for "Scanned Retinal Display with Exit Pupil Selected Based on Viewer's Eye Position" of Michael Tidwell, which is a continuation of U.S. Pat. No. 6,043,799 issued Mar. 28, 2000 based on application Ser. No. 09/027,356 filed Feb. 20, 1998 for "Virtual Retinal Display with Scanner Array for Generating Multiple Exit Pupils."

BACKGROUND OF THE INVENTION

This invention relates to retinal display devices and optical scanner devices, and more particularly to methods for duplicating exit pupils and for switching among exit pupils.

A virtual retinal display (VRD$_{TM}$) device is an optical device for generating a virtual image to be perceived by a viewer's eye. Light is emitted from a light source, collimated through a lens, then passed through a scanning device. The scanning device defines a scanning pattern for the light. The scanned light converges to focus points of an intermediate image plane. As the scanning occurs the focus point moves along the image plane (e.g., in a raster scanning pattern). The light then diverges beyond the plane. An eyepiece is positioned along the light path beyond the intermediate image plane at some desired focal length. An "exit pupil" occurs shortly beyond the eyepiece in an area where a viewer's eye pupil is to be positioned.

A viewer looks into the eyepiece to view an image. The eyepiece receives light that is being deflected along a raster pattern. Light thus impinges on the viewer's eye pupil at differing angles at different times during the scanning cycle. This range of angles determines the size of the virtual image perceived by the viewer. Modulation of the light during the scanning cycle determines the content of the image. For a see-through display a user sees the real world environment around the user, plus the added image of the display projected onto the retina.

Typically, the exit pupil defined by the display device is less than 2 mm in diameter and often less than 1 mm in diameter. The viewer's eye pupil varies from approximately 2 mm in diameter under bright light to approximately 7 mm in a dark environment. Because of the small exit pupil, a first step for a viewer is to adjust eye position to find the exit pupil. The viewer's pupil needs to achieve and maintain alignment with the display device's exit pupil so that light from the display device can enter the user's pupil and reach the viewer's retina. While in alignment, the light can scan directly onto the viewer's retina without any intermediary screens, cathode ray tubes (CRT's) or liquid crystal display devices (LCD's). The result is an image perceived by the viewer.

A shortcoming of conventional scanned retinal displays is the difficulty of maintaining alignment between the exit pupil and the viewer's pupil. If the viewer moves, alignment may be lost. Movement is problematic because the viewer's eye tends to move when the viewer attempts to view a peripheral portion of the image. Movement of the viewer's head relative to the display or even blinking may move the eye relative to the exit pupil. As a result, conventional exit pupils are inconvenient for the viewer. In particular a lay consumer using a virtual retinal display would find the alignment requirement difficult to maintain for long term viewing applications, such as entertainment, or for wide field view images. Accordingly, there is a need for a scanned display device having an exit pupil defined so as to enable easier viewing of the image.

Within the scanned display, optical scanners typically scan light onto the retina.

In an exemplary configuration one scanner is used to provide horizontal deflection of a light beam, while another scanner is used to provide vertical deflection of the light beam. Together the two scanners deflect the light beam along a raster or similar pattern. Each of the scanners includes a respective mirror that deflects light along a path defined by the deflection angle of the mirror. At the same time that the beam is scanned, the beam also is modulated responsive to image information, such as video signals. Where the display is a color display, the image information includes RGB color data that is used to separately modulate red, green and blue components of the light beam. The three modulated components are then combined and scanned in raster format onto the retina to produce a color virtual image.

Scanning rate and physical deflection distance characterize the movement of the scanner's mirror. In the context of a scanned retinal display the scanning rate and deflection angles are defined to meet the limits of the human eye. The scanning rate determines the number of times the beam strikes a region of the retina in a given time period. For the eye to continually perceive an ongoing image the light beam rescans the image, or a changing image, in periodic fashion. Analogous to refreshing a pixel on a display screen, the eye's retinal receptors must receive light from the scanning light beam periodically. The minimum refresh rate is a function of the light adaptive ability of the eye, the image luminance, and the length of time the retinal receptors perceive luminance after light impinges. To achieve television quality imaging the refresh rate typically is at least 50 to 60 times per second (i.e., $\geq 50$ Hz to 60 Hz). Further, to perceive continuous movement within an image the refresh rate typically is at least 30 Hz.

The mirror deflection angle is defined by the desired field of view and the eyepiece magnification. The field of view is the range of angles at which the retina receives light. Larger fields of view correspond to larger scan angles.

SUMMARY OF THE INVENTION

According to the invention, a scanned display includes an optical scanning array to generate a plurality of exit pupils. As a user's eye moves, the eye receives light from successive exit pupils. The user therefore has more freedom of movement while viewing images from the virtual retina display. The device thus generates multiple exit pupils without placing an exit pupil expansion device at the intermediary image plane. This method of generating multiple exit pupils leaves the line of sight clear while expanding the effective exit pupil of the scanned display. This is particularly advantageous in an augmented vision display which includes a real world view and all overlaid image.

According to another method of this invention, a viewer's eye position is tracked to determine which of the exit pupils is aligned with the eye. The determined exit pupil is enabled, while the remaining exit pupils are blocked or disabled. An advantage of this method is that small exit pupils are generated instead of a single large exit pupil. The small exit pupils increase the display resolution for a person with impaired vision through a pinhole effect to reduce optical effects of eye aberrations. Thus, the advantages of a larger effective exit pupil are achieved by generating multiple exit pupils, while the advantages of the pin hole effect are achieved concurrently by enabling only the one exit pupil which is to enter the user's eye.

These and other aspects and advantages of the invention will be better understood by reference to the following detailed description taken in conjunction with the accompanying drawings.

BRIEF DESCRIPTION OF THE DRAWINGS

FIG. 1 is a block diagram of a scanned retina display according to an embodiment of this invention;

FIG. 2 is an optical schematic of the scanned retina display according to an embodiment of this invention;

FIG. 8 is a diagram of an augmented scanned retina display according to an embodiment of this invention.

DESCRIPTION OF SPECIFIC EMBODIMENTS

Overview

Figure 3:
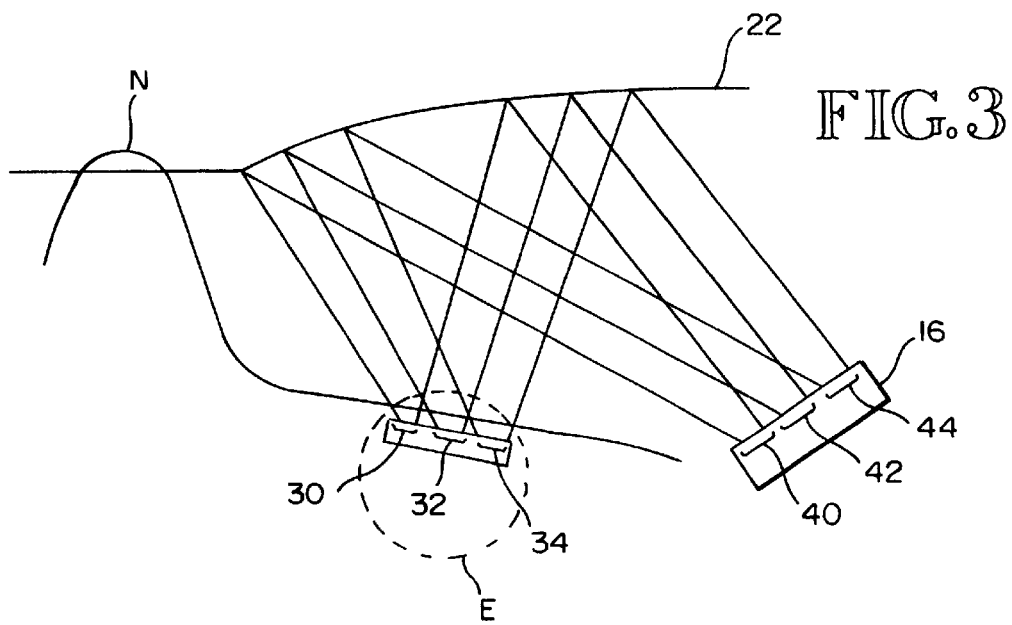
FIG. 3 is a diagram of light from 3 exit pupils directed toward an eye.
Figure 6:
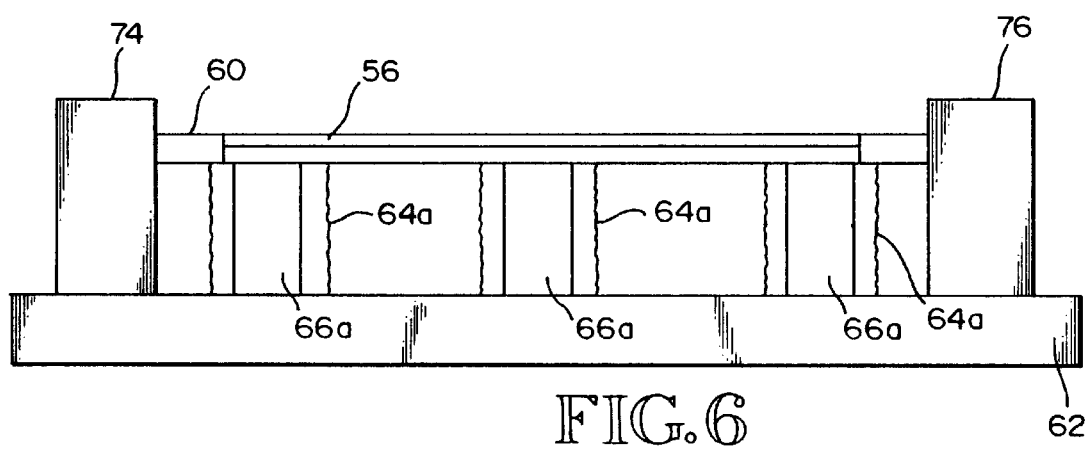
FIG. 6 is a planar side view of the scanning array of FIG. 4.
Figure 7:
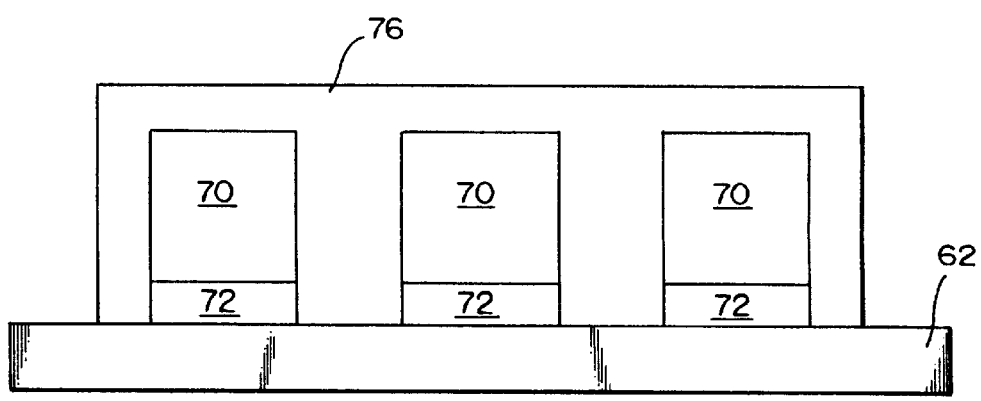
FIG. 7 is another planar side view of the scanning array of FIG. 4.

FIG. 1 is a block diagram of a scanned retina display 10 according to an embodiment of this invention. The display 10 generates and manipulates light to create color or monochrome images having narrow to panoramic fields of view and low to high resolutions. Light modulated with video information is scanned directly onto the retina of a viewer's eye E to produce the perception of an erect virtual image. The display 10 may be small in size and suitable for hand-held operation or for mounting on the viewer's head.

The display 10 includes an image data interface 11 which receives an image signal, such as an RGB signal, NTSC signal, VGA signal or other formatted color or monochrome video or image data signal, from a computer device, video device or other digital or analog image data source. The image data interface generates signals for controlling a light source 12. Light generated by the display 10 is altered according to the image data to generate image elements (e.g., image pixels) which form an image scanned onto the retina 13 of a viewer's eye E.

The light source 12 includes one or more point sources of light. In one embodiment red, green, and blue light sources are included. Preferably the emitted light is spatially coherent. Light from the light sources 12 is modulated according to the input image data signal content to produce light which is input to an optics subsystem 14. The light may be modulated by directly modulating the light source 12 or by a light modulator external to the light source 12.

The emitted light 36 is deflected by a scanner subsystem 16 toward an eyepiece 20 that shapes and focuses the scanned light for viewing by the eye E. The scanning subsystem includes a horizontal scanner and a vertical scanner that typically deflect the light along a raster pattern, although in an alternative embodiment another display format such as vector imaging can be used. In one embodiment the scanning subsystem 16 receives a horizontal deflection signal and a vertical deflection signal derived from the image data interface 11. In another embodiment, the scanning subsystem is modulated independently of the image signal. For example, the scanning subsystem 16 may include a mechanically resonant scanner, such as that described in commonly-assigned U.S. Pat. No. 5,467,104 issued Nov. 14, 1995 for "Virtual Retinal Display". In such embodiment, the image data interface 11 buffers the image data in an intermediate memory and then forwards the image data to the light source 12 in response to the detected position of the resonant scanner.

According to an embodiment of this invention either one of the horizontal scanner or vertical scanner 26 is formed by a scanner array 24. In a preferred embodiment shown in FIG. 2 the horizontal scanner is the scanner array and includes three scanner elements 40, 42, 44. The scanner array 24 generates an array of redundant exit pupils 30, 32, 34 at any given time. Although 3 exit pupils 30–32 are shown fewer or more exit pupils are generated by an optical scanner array having fewer or more scanners.

In one embodiment the position of the eye E is monitored by an eye tracker 22. The eye tracker receives light reflected from the eye E back through the eyepiece 20 and split off by a beam splitter 22. The position of the eye is used to identify which of the array of exit pupils 30, 32, 34 is aligned with the eye. In one embodiment only the aligned exit pupil is active—the others being blocked or blanked.

FIG. 3 shows a configuration for an augmented scanned display in which the viewer sees the real world with an image overlaid on all or a portion of the field of view. The eyepiece 22 is a lens which reflects light received from the scanner subsystem 16. The scanner array depicted includes three scanner elements 40, 42, 44. Scanner element 40 generates exit pupil 30. Scanner element 42 generates exit pupil 32. Scanner element 44 generates exit pupil 34.

Light Source

The light source 12 includes a single or multiple light sources. For generating a monochrome image a single monochrome source typically is used. For color imaging, multiple light sources are used. Exemplary light sources are colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Additional detail on these and other light source 12 embodiments are found in U.S. Pat. No. 5,596,339 issued Jan. 21 1997 for "Virtual Retinal Display with Fiber Optic Point Source" (Ser. No. 08/439,818, filed May 9, 1995), and incorporated herein by reference.

According to alternative embodiments, the light sources or the light generated by the point sources are modulated to include red, green, and/or blue components at a given point (e.g., pixel) of a resulting image. Respective beams of the point sources are modulated to introduce color components at a given pixel.

Image Data Interface

An exemplary embodiment of the image data interface 11 extracts color component signals and synchronization signals from the received image data signal. Extracted red, green and blue components are routed to respective modulators. In response the modulators modulate light from the red, green and blue light sources according to the information state of the extracted components. The image data signal interface 11 also extracts a horizontal synchronization component and vertical synchronization component from the image data signal. As discussed above, such signals can define respective frequencies for horizontal scanner and vertical scanner drive signals routed to the scanning subsystem 16 or can be used to clock data into the intermediate memory for buffering.

Optics Subsystem

The optics subsystem 14 receives the light output from the light source, either directly or after passing through the scanning subsystem 16. In some embodiments the optical subsystem collimates the light. In another embodiment the optics subsystem converges the light. Left undisturbed the light converges to a focal point then diverges beyond such point. In FIG. 2 the focal point occurs between the scanning subsystem 16 and eyepiece 22. As the converging light is deflected, however, the focal point is deflected. The pattern of deflection defines a pattern of focal points. Such pattern is referred to as an intermediate image plane.

Scanning Subsystem

The scanning subsystem 16 is located after the light sources 12, either before or after the optics subsystem 14 and contains the horizontal and vertical scanners 24, 26. In one embodiment the horizontal scanner 24 includes the array of scanning elements 40, 42, 44 for performing horizontal beam deflection and the vertical scanner 26 is a galvanometer. In alternative embodiments the vertical scanner can be formed by acousto-optical deflectors, electro-optical deflectors, or rotating polygon scanners. The vertical scanner 26 receives a drive signal having a frequency defined by the vertical synchronization signal VSYNC extracted at the image data interface 11. Preferably, the horizontal scanner 26 receives a drive signal approximating its resonant frequency. As will be explained below, the image data interface adjusts the rate at which image data arrives at the respective optical modulators in response to the detected frequency of the scanning elements 40, 42, 44. Thus, the modulation rate of the light beams is defined indirectly by the resonant frequency of the scanning elements so that during each scan of the scanning elements 40, 42, 44 one line of image data is output by the respective modulators.

Figure 4:
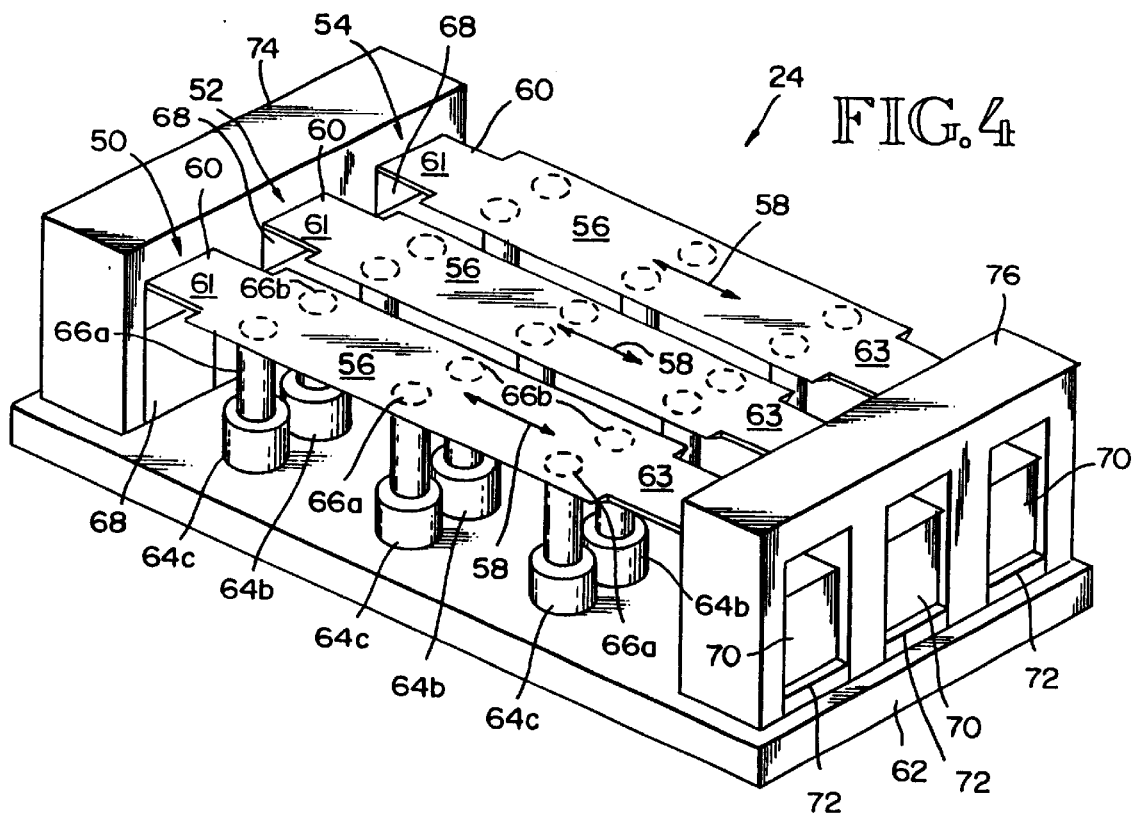
FIG. 4 is a perspective drawing of an exemplary scanning array for a scanning subsystem according to an embodiment of this invention.
Figure 5:
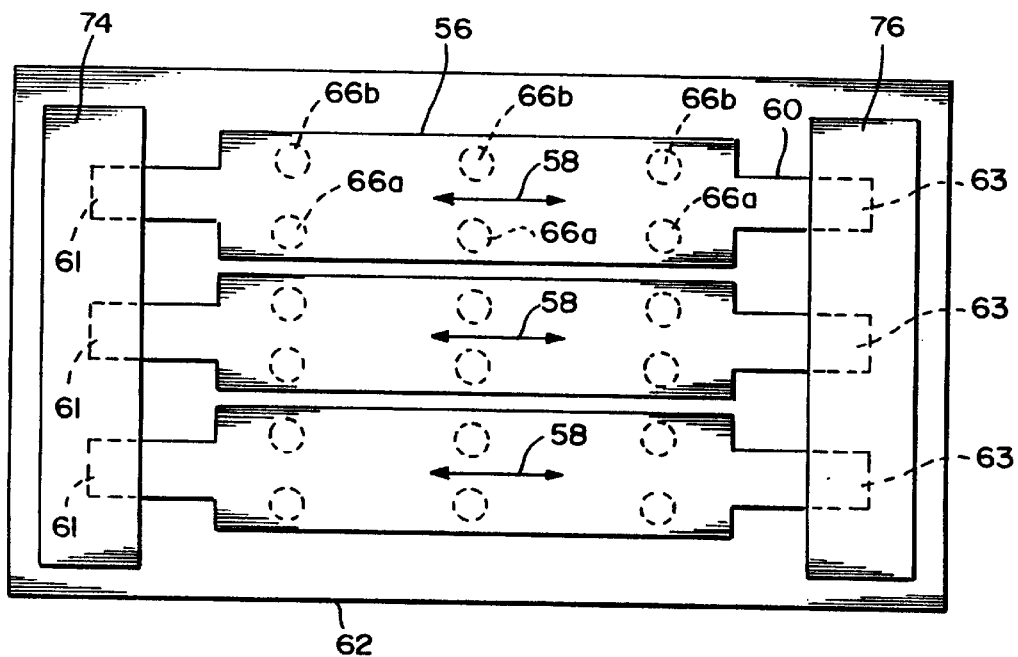
FIG. 5 is a planar top view of the scanning array of FIG. 4.

FIG. 4 shows the scanner array 24 in an area detail with scanning elements 40 42, 44. Each scanning element 40, 42, 44 includes a mirror 56 driven by a magnetic circuit so as to oscillate at a high frequency about a respective axis of rotation 58. Although three scanning elements are shown fewer or more are included in other embodiments. In one embodiment the only moving parts are the mirrors 56 and respective spring plates 60. The mirrors 56 are mounted to or formed by a polished surface of the spring plates 60. The optical scanner array 24 also includes a base plate 62 that carries electromagnetic coil pairs 64 and corresponding stator posts 66 for each of the mirrors 56. In the embodiment shown there are three pairs of coils/posts per mirror 56. The stator coils 64a and 64b of each pair are wound in opposite directions about the respective stator posts 66a and 66b. The electrical coil pairs 64 are connected in series or in parallel to a drive circuit as discussed below.

Mounted on opposite ends of the base plate 62 are first and second magnets 68, 70 for each spring plate 60. The magnets 68, 70 for a given spring plate 60 are equidistant from the stator posts 66 for such spring plate 60 and corresponding mirror 56. The base 62 forms respective backstops 72 and seats for the magnets 68, 70.

The spring plates 60, magnets 68, 70 and the base plate 62 are tightly clamped together by respective spring plate caps 74, 76. Each cap 74, 76 is formed as a block with openings.

The openings are formed so that the caps 252, 258 can accommodate the ends 61, 63 of the spring plates 60, and the magnets 68, 70. Each cap 74, 76 is held securely to the base plate 62 so as to clamp the spring plates 60 and magnets 68, 70 to the base 62.

The spring plates 62 are formed of spring steel and are torsional springs having a spring constant determined by their lengths and widths. Ends of the spring plates rest on respective poles of the respective magnets 68, 70. The magnets 68, 70 are oriented such that they have like poles adjacent the spring plates.

Each mirror 56 is mounted directly over the corresponding stator posts 66a and 66b such that the axis of rotation 58 of the mirror is equidistant from the stator posts 66a and 66b. Each mirror 56 is mounted on or coated on or formed by a polished portion of the corresponding spring plate 60. The three mirrors 56 and spring plates 60 are machined to close tolerances to assure that their resonant frequencies are substantially the same. If the resonant frequencies differ slightly, the mirrors 56 and spring plates 60 may be polished or weighted to shift the resonant frequencies closer together. For fine tuning the frequencies, one or more of the spring plates 60 may be stressed or compressed slightly by respective piezoelectric transducers electromagnetic servomechanisms to shift the resonant frequency.

Magnetic circuits are formed in each scanning element 40, 42, 44 to oscillate the respective mirrors 56 about the axes of rotation 58 in response to respective alternating drive signals. For each mirror 56, one magnetic circuit extends from the top pole of the magnet 68 to the spring plate end 61, through the spring plate 60, across a gap to each of the three stators 66a and through the base plate 62 back to the magnet 68 through its bottom pole. Another magnetic circuit extends from the top pole of the other magnet 70 to the other spring plate end 63, through the spring plate 60, across a gap to the three stators 66a and through the base plate 62 back to the magnet 70 through its bottom pole. Similarly, magnetic circuits are set up through the stators 66b for each mirror 56.

When a periodic drive signal such as a square wave is applied to the oppositely wound coils 64a and 64b for a given mirror 56, magnetic fields are created which cause such mirror 56 to oscillate back and forth about the axis of rotation 58. More particularly, when the square wave is high for example, the magnetic field set up by the magnetic circuits through the stators 66a and magnets 68 and 70 cause an end of the mirror to be attracted to the stators 66a. At the same time, the magnetic field created by the magnetic circuits extending through the stators 66b and the magnets 68 and 70 cause the opposite end of the mirror 56 to be repulsed by the stators 66b. Thus, each such mirror 56 is caused to rotate about the axis of rotation 56 in one direction. When the square wave goes low, the magnetic field created by the stators 66a repulse the end of the spring plate 60 whereas the stators 66b attract the other end of the spring plate 60 so as to cause the mirror 56 to rotate about the axis 56 in the opposite direction.

In alternative embodiments, the scanning array 24 instead includes acousto-optical deflectors, electro-optical deflectors, rotating polygons or galvanometers to perform the horizontal deflection.

Eyepiece

The eyepiece 20 typically is a multi-element lens or lens system receiving the light beam(s) prior to entering the eye E. In an alternative embodiment, the eyepiece 20 is a single lens. The eyepiece 20 serves to relay the rays from the light beam(s) toward a viewer's eye. In particular the eyepiece 20 contributes to the location where an exit pupil of the retina display 10 forms. The exit pupil is the image of the scanner aperture formed by the eyepiece. The eyepiece 20 defines the exit pupil at a known distance d from the eyepiece 20. Such location may be the expected location for a viewer's eye E.

In one embodiment the eyepiece 20 is an occluding element which does not transmit light from outside the display device 10. In an alternative embodiment, an eyepiece 20 includes a lens system that is transmissive so as to allow a viewer to view the real world in addition to the virtual image. In yet another embodiment the eyepiece is variably transmissive to maintain contrast between the real world ambient lighting and the virtual image lighting. For example a photosensor detects ambient lighting. A bias voltage is generated which applies a voltage across a photochromatic material to change the transmissiveness of the eyepiece 20.

Eye Tracker

Referring to FIG. 2, a portion of the light striking the eye E is reflected back through the eyepiece 20 toward the scanning subsystem 16. Before reaching the scanning subsystem 16 light reflected back from the eye E strikes a beamsplitter 18 which directs a portion to the eye tracker 22. The eye tracker adjusts the scanning subsystem 16 to shift the location of the exit pupils 30, 32, 34, thereby re-aligning the one or more exit pupils with the pupil of the eye E. An exemplary eye tracker is the Model 210 Eye Movement Monitor manufactured by Applied Science Laboratories of Bedford, Mass. Advantageously, in this embodiment the number of exit pupils may be small because the eye tracker 22 helps acquire the scanned beam, thereby reducing the difficulty of eye pupil to exit pupil alignment.

Method for Generating Multiple Exit Pupils

According to an embodiment of this invention, only one of the multiple exit pupils remains active at a given time. For such embodiment the eye tracker determines the position of the eye pupil and the exit pupils to which the eye pupil is not aligned are deactivated or dimmed. In such embodiment each of the mirrors 56 receives a separately modulated beam, rather than sharing a beam with the other mirrors 56. During the viewer's acquisition of the image, all of the beams are active. However, once the eye tracker 22 determines that the eye pupil is aligned to one of the exit pupils 30, 32, 34 the remaining beams are dimmed or blocked. In one embodiment the exit pupils are deactivated by controlling the drive signals to the respective mirrors 56. With no signal applied, the deactivated mirrors 56 return to their rest positions. In the rest positions, the mirrors 56 are angled so that they reflect light along a blocked optical path, whereby the reflected light is blocked from reaching the viewer's eye E.

Alternatively, the respective beams may be dimmed or blocked from reaching the respective mirrors by beam deflectors. In another alternative embodiment where each mirror includes an independent light source, the drive signal to the light source may be adjusted to correspond to a black image. Such an embodiment may be advantageous in applications where the resonant frequencies of the mirrors are difficult to synchronize by compensating for differences in scanning frequencies by adjusting the timing of data output from the buffered intermediate memory.

The benefit of activating only one exit pupil entering the eye is that a small exit pupil is formed which enables a viewer having aberrations or other eyesight defects to see the image clearly. The small exit pupil is beneficial to such viewer based upon what is referred to as a pinhole effect. Specifically, rays from the small diameter exit pupil converge upon a small portion of the retina. For a larger exit pupil the convergence area on the retina is larger for those with poor eyesight. Thus, the image appears blurry to such persons with certain eyesight defects. For a viewer with normal eyesight the rays converge to a point regardless of the exit pupil size. Thus, this method provides the advantage of multiple exit pupils which allow a viewer to see a virtual image overlaid upon a real background in an augmented display while moving the eye. This method also provides the advantages of a pinhole effect beneficial to those with certain eyesight defects.

FIG. 8 shows an optical schematic for an augmented scanned retina display according to an embodiment of this invention. The display 10' includes an image data interface 11 which receives image data from a computer device, video device or other digital or analog image data source. The image data interface generates signals for controlling the light source 12. Light generated by the display 10 is altered according to the image data to generate image elements (e.g., image pixels) which form an image scanned onto the retina of a viewer's eye E. The light enters an optics subsystem 14 and a scanning subsystem 16 having an optical scanner 24. The scanned light is then combined with the light from the ambient environment by beam splitters 80, 82, then is directed toward an eyepiece 20. As with the previously described embodiment, the optical scanning subsystem 16 scans the light so that multiple exit pupils 30, 32, 34 occur at a known distance from the eyepiece 20 toward the eye E. Advantageously, the beam splitters 80, 82 shift the non-transparent parts of the display 10' out of the viewer's line of sight. Thus, the viewer is able to see the surrounding real world ambient environment. The viewer perceives the virtual image as superimposed over the background light from the ambient environment.

Although preferred embodiments of the invention have been illustrated and described, various alternatives, modifications and equivalents may be used. Therefore the foregoing description should not be taken as limiting the scope of the inventions which are defined by the appended claims.

What is claimed is:

1. A method for generating a virtual image for viewing by a user in a scanning display that includes a plurality of scanners, comprising the steps of:

modulating a beam of light according to image information;

detecting a viewing location of a user's eye;

responsive to the detected viewing location, selecting a first scanner of the plurality of scanners; and directing a first portion of the modulated beam of light to the selected first scanner.

2. The method of claim 1, further comprising the steps of:

detecting a change in viewing location;

responsive to the detected change, selecting a second scanner of the plurality of scanners, the second scanner being different from the first scanner; and directing a second portion of the modulated beam of light to the selected second scanner.

3. The method of claim 2, wherein the step of directing the second portion to the second scanner is achieved by the step of selecting the second scanner.

4. The method of claim 2, where the first portion of the modulated beam of light is less than an entirety of the beam of light.

5. The method of claim 2, where the second portion differs from the first portion.

6. A method for generating a virtual image for viewing by a user in a scanning display that includes a plurality of scanners and a plurality of light sources, comprising the steps of:

modulating a beam of light from each one of the plurality of light sources according to image information;

detecting a viewing location of a user's eye;

responsive to the detected viewing location, selecting a first scanner of the plurality of scanners; and directing a first portion of the modulated beam of light from each one of the plurality of light sources to the selected first scanner.

7. The method of claim 6, further comprising the steps of:

detecting a change in viewing location;

responsive to the detected change, selecting a second scanner of the plurality of scanners, the second scanner being different from the first scanner; and directing a second portion of the modulated beam of light from each one of the plurality of light sources to the selected second scanner.

8. The method of claim 7, wherein the step of directing the second portion to the second scanner is achieved by the step of selecting the second scanner.

9. The method of claim 7, where the first portion of the modulated beam of light from each one of the plurality of light sources is less than an entirety of the beam of light from each one of the plurality of light sources.

10. The method of claim 7, where the second portion differs from the first portion.

11. An optical scanning assembly comprising:

a plurality of scanners, each one scanner of the plurality of scanners scanning at a common scanning frequency;

a modulated light source that emits a beam of light modulated with image information at a rate corresponding to the common scanning frequency; and a beam steering optic configured to selectively direct a portion of the light beam to a select scanner of the plurality of scanners.

12. The assembly of claim 11, wherein the portion is a first portion and the select scanner is a first scanner, and further comprising:

a detector which detects a change in viewing position; and wherein the beam steering optics responsive to the detected change directs a second portion of the light beam to a second scanner of the plurality of scanners, the second scanner different from the first scanner.

13. The assembly of claim 12, where the first portion of the modulated beam of light is less than an entirety of the beam of light.

14. The assembly of claim 12, where the second portion differs from the first portion.

15. An optical scanning assembly, comprising:

a plurality of scanners, each one scanner of the plurality of scanners scanning at a common scanning frequency;

a plurality of modulated light source, each light source emitting a beam of light modulated with image information at a rate corresponding to the common scanning frequency; and a beam steering optic configured to selectively direct a portion of the light beam of each one light source of the plurality of light sources to a select scanner of the plurality of scanners.

16. The assembly of claim 15, wherein the portion is a first portion and the select scanner is a first scanner, and further comprising:

a detector which detects a change in viewing position; and wherein the beam steering optics responsive to the detected change direct a second portion of the light beam from each one of the plurality of light sources to a second scanner of the plurality of scanners, the second scanner different from the first scanner.

17. The assembly of claim 16, where the first portion of the modulated beam of light from each one light source of the plurality of light sources is less than an entirety of the beam of light from each one of the plurality of light sources.

18. The assembly of claim 16, where the second portion differs from the first portion.

* * * * *